US008130734B2

(12) United States Patent
Delia et al.

(10) Patent No.: US 8,130,734 B2
(45) Date of Patent: Mar. 6, 2012

(54) METHODS, SYSTEMS AND COMPUTER PROGRAM PRODUCTS FOR MANAGING THIRD PARTY ACCESS TO A WIRELESS NETWORK BY A NETWORK OWNER

(75) Inventors: David J. Delia, Lagrangeville, NY (US); Wayne M Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 11/624,864

(22) Filed: Jan. 19, 2007

(65) Prior Publication Data

US 2008/0177898 A1    Jul. 24, 2008

(51) Int. Cl.
*H04W 4/00* (2009.01)
*H04M 11/00* (2006.01)
(52) U.S. Cl. ................ 370/338; 455/408; 455/432.3
(58) Field of Classification Search .................. 370/338; 709/250; 455/405, 406, 408, 432.3, 435.2, 455/552.1
See application file for complete search history.

(56) References Cited

U.S. PATENT DOCUMENTS

| | | | |
|---|---|---|---|
| 6,614,769 B1 | 9/2003 | Erlick et al. | |
| 6,647,260 B2 * | 11/2003 | Dusse et al. | 455/419 |
| 6,934,558 B1 | 8/2005 | Sainton et al. | |
| 7,194,273 B2 * | 3/2007 | Vaudreuil | 455/456.3 |
| 2003/0229595 A1 * | 12/2003 | Mononen et al. | 705/63 |
| 2004/0022242 A1 * | 2/2004 | Bhogal et al. | 370/389 |
| 2004/0047324 A1 * | 3/2004 | Diener | 370/338 |
| 2004/0219914 A1 | 11/2004 | Patel | |
| 2005/0003822 A1 | 1/2005 | Aholainen et al. | |
| 2005/0096058 A1 | 5/2005 | Warner et al. | |
| 2005/0181808 A1 * | 8/2005 | Vaudreuil | 455/456.3 |
| 2005/0243778 A1 * | 11/2005 | Wang et al. | 370/338 |
| 2006/0025156 A1 | 2/2006 | Campbell | |
| 2006/0058006 A1 * | 3/2006 | Hurtta et al. | 455/405 |
| 2006/0253294 A1 * | 11/2006 | Martti et al. | 705/1 |
| 2007/0189241 A1 * | 8/2007 | Zhang | 370/338 |
| 2008/0008140 A1 * | 1/2008 | Forssell | 370/338 |
| 2008/0146269 A1 * | 6/2008 | Pirzada et al. | 455/552.1 |
| 2008/0256220 A1 * | 10/2008 | Bachmann et al. | 709/222 |

* cited by examiner

*Primary Examiner* — Christopher M Brandt
(74) *Attorney, Agent, or Firm* — Cantor Colburn LLP

(57) ABSTRACT

Methods, systems, and computer program products for managing access to a wireless local area network are provided. A method includes establishing a communication between a first and second software intelligent agent via the wireless local area network. The first software intelligent agent is internal to the wireless local area network and the second software intelligent agent is associated with a cognitive radio-enabled communications device that is external to the wireless local area network. The method also includes retrieving user-configured settings for designating terms of use of the wireless local area network. The user-configured settings are established by, and retrieved via, the first software intelligent agent. The method further includes presenting the terms of use to the second software intelligent agent and providing the cognitive radio-enabled communications device with access to the wireless local area network, subject to the user-configured settings, upon acceptance of the terms of use by the second software intelligent agent.

15 Claims, 3 Drawing Sheets

METHODS, SYSTEMS AND COMPUTER PROGRAM PRODUCTS FOR MANAGING THIRD PARTY ACCESS TO A WIRELESS NETWORK BY A NETWORK OWNER

BACKGROUND OF THE INVENTION

The present disclosure relates generally to wireless network communications and, in particular, to methods, systems, and computer program products for managing access to a wireless network.

Wireless network technologies and associated communications devices have been steadily advancing in performance and popularity. For example, cognitive radio communications have become an emerging technology for smart wireless communications. Early prototypes enable wireless radio devices to find and connect with any nearby open radio frequency. This has the potential to optimize service quality and availability to the user of wireless devices by automatic switching from overloaded frequency bands, or those affected by interference, to other available frequency bands. Cognitive radio technology includes adaptive software that enable alterations of frequency band use based on "sense and remember" of previous usage and availability factors.

Currently, different devices connecting wirelessly to the Internet are limited to a specified network. For example, portable personal computers connect to the Internet using a network accessible on a specific frequency band. Cognitive radio proposes to enable optimized communication transmission by enabling a communications device to switch to an available wireless network on a different frequency when the original connection is no longer available. An illustration might be the automatic network-switching of a cognitive radio-enabled device enabling a single connection to the Internet via different networks on different frequencies while traveling a considerable distance. Thus, an Internet user beginning with an active laptop connection to his own home wireless network may automatically switch to any available network as necessary, such as other open or non-protected residential networks or private corporation local area networks, and/or pay-per-use protected networks during a road trip.

As described above, one disadvantage to this approach is that not all networks "cost" the same to use. Hotel wireless networks are typically notoriously overpriced, while many residential networks currently have no cost at all allocated to other users. These wide-ranging discrepancies in the costs of using another's network resources may be troublesome to users of wireless network devices who have no real certainties concerning the total costs of network usage. In addition, open or unprotected wireless area networks may be subject to security threats inflicted by third parties, as well as reduced bandwidth capabilities when there is unauthorized third party use.

What is needed, therefore, is a way to configure the cost and degree of participation in network usage, such as cognitive radio use.

BRIEF SUMMARY OF THE INVENTION

Embodiments of the invention include methods for managing access to a wireless local area network. A method includes establishing a communication between a first and second software intelligent agent via the wireless local area network. The first software intelligent agent is internal to the wireless local area network and the second software intelligent agent is associated with a cognitive radio-enabled communications device that is external to the wireless local area network. The method also includes retrieving user-configured settings for designating terms of use of the wireless local area network. The user-configured settings are established by, and retrieved via, the first software intelligent agent. The method further includes presenting the terms of use to the second software intelligent agent and providing the cognitive radio-enabled communications device with access to the wireless local area network, subject to the user-configured settings, upon acceptance of the terms of use by the second software intelligent agent.

Additional embodiments include systems for managing access to a wireless local area network. A system includes a first software intelligent agent executing on a computer processing device. The system also includes a second software intelligent agent executing on a cognitive radio-enabled communications device. The wireless area network performs a method via the first and second software intelligent agents. The method includes establishing a communication between the first and second software intelligent agent via the wireless local area network. The first software intelligent agent is internal to the wireless local area network and the second software intelligent agent is external to the wireless local area network. The method also includes retrieving user-configured settings for designating terms of use of the wireless local area network. The user-configured settings are established by, and retrieved via, the first software intelligent agent. The method further includes presenting the terms of use to the second software intelligent agent and providing the cognitive radio-enabled communications device with access to the wireless local area network, subject to the user-configured settings, upon acceptance of the terms of use by the second software intelligent agent.

Further embodiments include computer program products for managing access to a wireless local area network. A computer program product includes instructions for causing a computer to implement a method. The method includes establishing a communication between a first and second software intelligent agent via the wireless local area network. The first software intelligent agent is internal to the wireless local area network and the second software intelligent agent is associated with a cognitive radio-enabled communications device that is external to the wireless local area network. The method also includes retrieving user-configured settings for designating terms of use of the wireless local area network. The user-configured settings are established by, and retrieved via, the first software intelligent agent. The method further includes presenting the terms of use to the second software intelligent agent and providing the cognitive radio-enabled communications device with access to the wireless local area network, subject to the user-configured settings, upon acceptance of the terms of use by the second software intelligent agent.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with exemplary embodiments, methods, systems, and computer program products for network access management services are provided. The network access management services enable user-configurable settings for specifying constraints, costs, and limiting restrictions on the automatic frequency-switching capability of cognitive radio wireless communication devices to make use of a network owned under the control of a user (referred to herein as "network owner") providing the configurable settings. The user-configurable settings provide terms of use of the network by third parties (also referred to herein as "third party network user"). In addition, the network access management services enable a prospective user (i.e., third party network user) of the network to convey, to the network owner, terms of acceptance for using the network. For example, the owner of a home wireless network may specify that no connections from third-party or 'foreign' units will be permitted. Another home network owner may specify that a maximum of 20% total bandwidth may be offered up for cognitive radio roaming use. A hotel wireless network may allow any of its customers to make use of the hotel's networks, as long as the customers agree to pay a fee. The first owner of the home wireless network might be persuaded to participate if he could set the "cost" for use of his network by mobile units passing by, and that revenues generated could result in a chargeback credit to the owner's Internet service provider (ISP) monthly bill. Current implementations of typical wireless networks are capable of "all-or-nothing" firewall protection with no capability of the network owner to specify variable partial levels of availability, cost, and service to cognitive radio devices.

Figure 1:
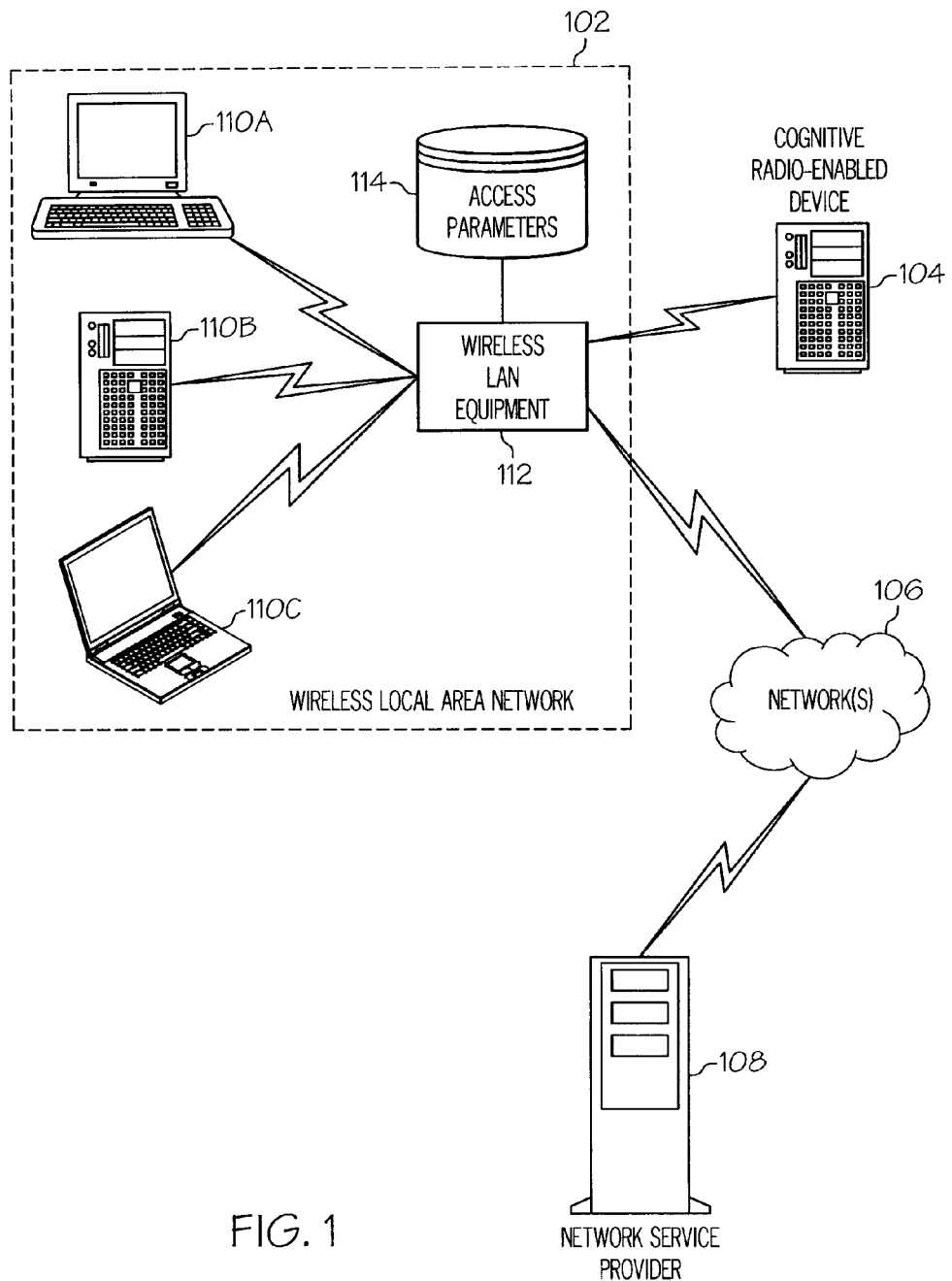
FIG. 1 depicts a portion of a system upon which network access management services may be implemented in exemplary embodiments.

Turning now to FIG. 1, a portion of a system upon which the network access management services may be implemented will now be described in accordance with exemplary embodiments. The system of FIG. 1 includes a wireless local area network (WLAN) 102 in communication with a cognitive radio-enabled device 104 and one or more networks 106. WLAN 102, in turn, includes communications devices 110A-110C in communication with wireless local area network (WLAN) equipment 112 to form the WLAN 102. WLAN 102 may be a home/residential network, personal area network, or other similar type of network. As illustrated in the system of FIG. 1, the communications devices 110A-110C include a general-purpose desktop computer 110A, a personal digital assistant (PDA) 110B, and a laptop 110C. Each of communications devices 110A-110C includes or is in communication with an access device (e.g., wireless access point, network card, etc.) for establishing and maintaining wireless communications with one another, as well as with external network entities (e.g., devices or systems outside of the WLAN 102) via WLAN equipment 112.

In exemplary embodiments, WLAN equipment 112 includes various devices for facilitating inter- and intra-network communications (e.g., modem, router, repeaters, switches, etc.). One or more of these devices may be integrated with one another and/or with one or more communications devices 110A-110C. For example, a router may be communicatively coupled to a modem and also to communications device 110A, which in turn, acts as a central communications hub (e.g., server and traffic arbitrator) for other communications devices in the WLAN 102 with respect to inter- and intra-network communications. Alternatively, the communications devices 111A-110C may be configured as an ad-hoc network whereby each of the devices 110A-110C is self-managed and communications traffic is facilitated via, e.g., pseudo-random algorithms. In addition, WLAN equipment 112 (e.g., cable/DSL modem) may interface with outside networks (e.g., networks 106), providing Internet services to the WLAN 102.

WLAN 112 may also include a computer processing device executing a software intelligent agent for implementing the network access management services. Alternatively, the software intelligent agent may be implemented via one of communications devices 110A-110C (e.g., if acting as a central hub of the WLAN 102). The software intelligent agent may be an application that includes a graphical user interface (GUI) for enabling a user at the WLAN 102 to select or configure network access settings and permissions. The software intelligent agent may be a rules-based application that compares current network conditions (e.g., bandwidth availability) and factors such as end-user or third-party device identity, time of day, usage costs, etc. with the selections configured by the network owner to establish, limit, or deny access to the WLAN 102 by third party devices.

In exemplary embodiments, a storage device 114 is included in the WLAN 102. Storage device 114 may be implemented using a variety of devices for storing electronic information. It is understood that the device 114 may be implemented using memory contained in the computer processing devices of WLAN equipment 112 or communications devices 110A-110C, or it may be a separate physical device. The storage device 114 is logically addressable as a consolidated data source across a distributed environment that includes the WLAN 102. Information stored in the storage device 114 may be retrieved and manipulated via the devices in the WLAN 102 and/or by external network entities. The storage device 114 may include a data repository containing user-configurable parameters or settings facilitated via the network access management services.

Storage device 114 is in communication with WLAN equipment 112 and stores various information used in implementing the network access management services. For example, storage device 114 stores user-configurable access parameters as described further herein.

In exemplary embodiments, cognitive radio-enabled device 104 refers to a communications device that includes radio transmitter/receiver elements, a processor, and software designed to intelligently detect whether a particular segment of the radio spectrum is in use and may switch over to an unused part of the spectrum without interfering with the transmission of other communications devices in range. Cognitive radio-enabled device 104 may comprise a superheterodyne radio frequency front end that converts radio frequency signals from and to analog IF signals and an analog-to-digital converter and digital-to-analog converter for converting IF signals from and to analog format, respectively. In exemplary embodiments, cognitive radio-enabled device 104 further includes a software intelligent agent (referred to herein as "second software intelligent agent") for receiving user-configurable settings from a user of the cognitive radio-enabled device 104 via, e.g., a user interface component of the second software intelligent agent implemented by the cognitive radio-enabled device 104. A sample user interface screen 300 is shown generally in FIG. 3.

Cognitive radio-enabled device 104 may be any type of communications device that utilizes radio frequencies, e.g., wireless computer device (e.g., laptop), a personal digital assistant, a cellular telephone, a pager, a global positioning system, an amateur radio, etc.

Also included in the system of FIG. 1 is a network service provider system 108. Network service provider system 108 is in communication with WLAN 102 and, optionally cognitive radio-enabled device 104, via networks 106. Network service provider system 108 may be implemented using one of more servers operating in response to a computer program stored in a storage medium accessible by such servers. The network service provider system 108 may operate as a network server (e.g., a web server) to communicate with the WLAN 102, and optionally cognitive radio-enabled device 104, and performs associated tasks. In exemplary embodiments, network service provider system 108 provides Internet services to its customers, e.g., users/network owner of WLAN 102.

Networks 106 may comprise any type or combination of known networks including, but not limited to, a Wide Area Network (WAN), a global network (e.g., Internet), a Virtual Private Network (VPN), or other network configuration known in the art. These networks may be implemented using a wireless network or physically connected to each other in a state of the art configuration. One or more of the WLAN 102 and cognitive radio-enabled device 104 may be coupled to the network service provider 108 through multiple networks (e.g., intranet and Internet) so that not all network entities (e.g., WLAN 102 and cognitive radio-enabled device 104 are coupled to the network service provider system 108 through the same network.

As indicated above, the network access management services enable user-configurable settings for specifying constraints, costs, and limiting restrictions on the automatic frequency-switching capability of cognitive radio wireless communication devices to make use of a network owned under the control of a network owner providing the configurable settings. The user-configurable settings provide terms of use of the network by third parties. In addition, the network access management services enable a prospective user (i.e., third party network user) of the network to convey, to the network owner, terms of acceptance for using the network.

Figure 3:
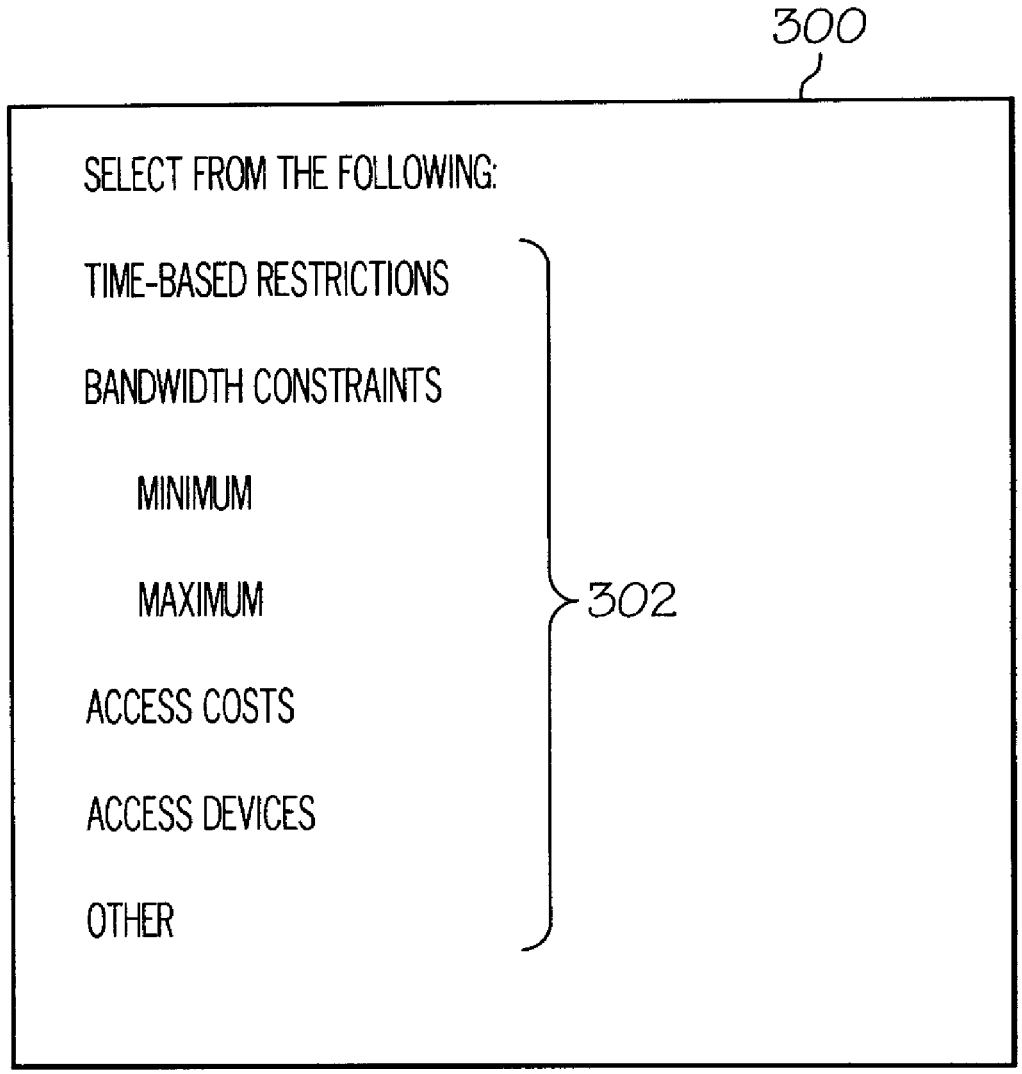
FIG. 3 is a user interface screen depicting selectable options provided by the network access management services in exemplary embodiments.

The WLAN 102 is configured with parameters recognizable by cognitive radio-enabled devices, e.g., cognitive radio-enabled device 104. The parameters may include a standard firewall protection available in present implementations of wireless networks (i.e., a setting which indicates if the wireless network is accessible by any outside devices, whether equipped with cognitive radio capabilities or not). Additionally, a parameter may be stored which optionally indicates the time interval in which the WLAN 102 will be available for access by cognitive radio-enabled devices. The owner of a home or business wireless network might need to restrict use of the network during peak or business hours, while allowing for more availability during off-peak hours. As well, the owner of a home or business wireless network may need to reserve a certain percentage of data transmission bandwidth, so an additional parameter is configured to allow partial bandwidth or a hard throughput limit of a certain number of megabytes or gigabytes which limits the use of the available bandwidth by cognitive radio-enabled devices. Finally, a set of parameters for the monetary price or the service-time bartering proposal may be configured and stored in the WLAN 102. These parameters may be broadcast to the cognitive radio-enabled devices within range, and the cognitive radio-enabled devices make the decision (based upon their own configuration capabilities) whether this cost is acceptable. If all conditions and constraints are met, the network may be made available for use by the cognitive radio-enabled devices. These user-configurable parameters, or settings, may be implemented via user input to the intelligent software agents executing on WLAN 102 and cognitive radio-enabled device 104, respectively, and collectively provide the network owner's "terms of use" of the WLAN 102. A sample user interface screen is shown in FIG. 3. As shown in the user interface screen 300 of FIG. 3, user-configurable settings 302 may include time-based restrictions on network usage (e.g., time of day), bandwidth constraints (e.g., minimum or maximum permitted bandwidth allocation), access costs (e.g., apportioned costs based on extent of use or credit to the network owner for allowing third-party usage of a network, etc.), and access devices (e.g., particular devices permitted to use the WLAN 102, such as an elderly neighbor, as identified by the device's IP or network address). The credit to the network owner, or charge back, may be implemented via the network service provider system 108, which may directly track network usage of WLAN 102 by authorized third parties (e.g., cognitive radio-enabled device 104), or may receive network usage data tracked by the WLAN 102.

Figure 2:
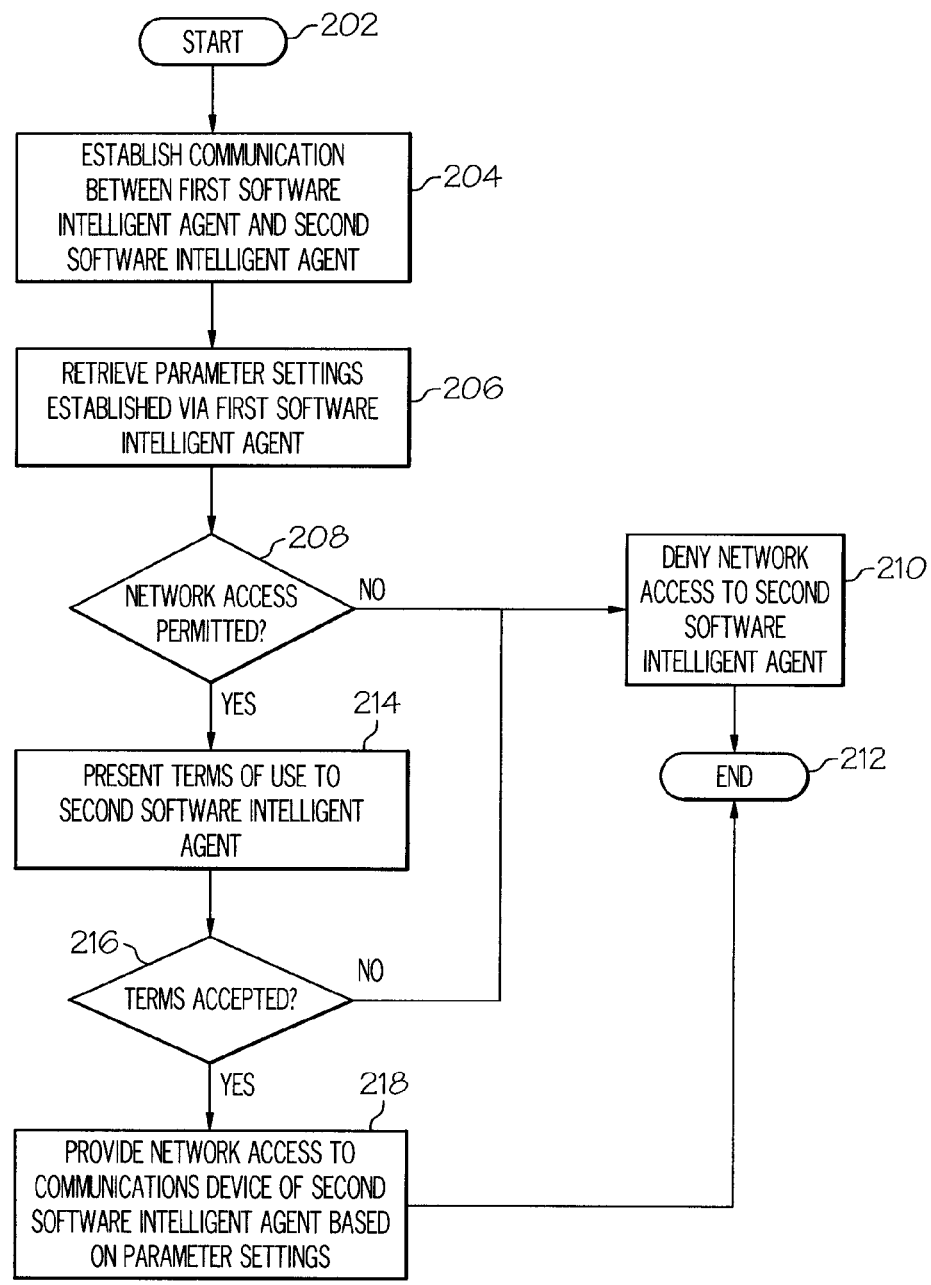
FIG. 2 is a flow diagram describing a process for implementing network access management services in exemplary embodiments.

Turning now to FIG. 2, a process for implementing the network access management services will now be described in accordance with exemplary embodiments. The process begins at step 202 whereby a communication is established between a software intelligent agent implemented at the WLAN 102 (also referred to herein as "first software intelligent agent") and a software intelligent agent implemented at the cognitive radio-enabled device 104 (also referred to herein as "second software intelligent agent") at step 204. The communication may be a simple network detection signal distributed between the transceiver elements of the WLAN 102 and the cognitive radio-enabled device 104 that is in range of the WLAN 102.

At step 206, the user-configured parameter settings are retrieved and processed from storage device 114. At step 208, it is determined from the user-configured settings whether any access to the WLAN 102 is permitted. This may be a simple firewall implementation restricting all network access for external devices, or may result from constraints established via the settings which pre-empt any such external usage (e.g., insufficient available bandwidth, time of day restrictions, etc.). If no access is permitted, the cognitive radio-enabled device 104 is denied access to, and use of, the WLAN 102 at step 210 and the process ends at step 212.

Otherwise, if access is permitted, terms of use as provided in the user-configured settings are presented to the second software intelligent agent executing on cognitive radio-enabled device 104 at step 214. In response to a return communication from the cognitive radio-enabled device 104, it is determined whether the terms of use are accepted at step 216. The second software intelligent agent may retrieve user-configured settings relating to terms of acceptance of network usage from cognitive radio-enabled device 104 and transmit these terms of acceptance to the first software intelligent agent. In any event, if the terms of use (and optionally, acceptance) are approved at step 216, network access to the WLAN 102 is provided to the cognitive radio-enabled device 104 based upon the user-configured settings at step 218 and the process ends at step 212.

If, however, the terms of use are not accepted at step 216, access to the WLAN 102 is denied at step 210 and the process ends at step 212.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of managing access to a wireless local area network, comprising:
   establishing a communication between a first software intelligent agent and a second software intelligent agent via the wireless local area network, the first software intelligent agent internal to the wireless local area network and the second software intelligent agent associated with a cognitive radio-enabled communications device, the cognitive radio-enabled communications device external to, and within range of, the wireless local area network;
   retrieving a first set of user-configured settings established for designating terms of use of the wireless local area network, the first set of user-configured settings established by, and retrieved via, the first software intelligent agent, the terms of use including time of day based network usage restrictions for the cognitive radio-enabled communications device;
   retrieving a second set of user-configured settings for designating terms of use of the wireless local area network, the second set of user-configured settings established by the second software intelligent agent;
   presenting the terms of use to the second software intelligent agent, and the terms of use established via the second software intelligent agent to the first software intelligent agent; and
   providing the cognitive radio-enabled communications device with access to the wireless local area network upon acceptance of the terms of use by the second software intelligent agent, the acceptance generated from the cognitive radio-enabled communications device automatically based upon configuration capabilities of the cognitive radio-enabled communications device;
   wherein the access is subject to the first set of user-configured settings, and is implemented in response to acceptance, by the first software intelligent agent, of the terms of use established by the second software intelligent agent.

2. The method of claim 1, wherein the terms of use further include:
   network usage costs; and
   minimum bandwidth availability.

3. The method of claim 1, wherein the terms of use further include:
   time-based network usage restrictions for the cognitive radio-enabled device;
   maximum bandwidth allocation for network usage by the cognitive radio-enabled device;
   maximum throughput for use by the cognitive radio-enabled device;
   access device identity restrictions; and
   network usage access costs.

4. The method of claim 1, wherein the cognitive radio-enabled communications device includes at least one of a:
   laptop;
   cellular telephone;
   personal digital assistant;
   pager;
   global positioning system; and
   amateur radio.

5. The method of claim 1, wherein the user-configured settings are implemented via a user interface of the first intelligent software agent.

6. A system for managing access to a wireless local area network, comprising:
   a computer processing device executing a first software intelligent agent within the wireless local area network; and
   a cognitive radio-enabled communications device executing a second software intelligent agent;
   wherein the wireless local area network implements a method via the first and second software intelligent agents, comprising:
   establishing a communication between the first software intelligent agent and the second software intelligent agent via the wireless local area network, the first software intelligent agent internal to the wireless local area network and the cognitive radio-enabled communications device external to, and within range of, the wireless local area network;
   retrieving a first set of user-configured settings established for designating terms of use of the wireless local area network, the first set of user-configured settings established by, and retrieved via, the first software intelligent agent, the terms of use including time of day based network usage restrictions for the cognitive radio-enabled device;

retrieving a second set of user-configured settings for designating terms of use of the wireless local area network, the second set of user-configured settings established by the second software intelligent agent;

presenting the terms of use to the second software intelligent agent, and the terms of use established via the second software intelligent agent to the first software intelligent agent; and providing the cognitive radio-enabled communications device with access to the wireless local area network upon acceptance of the terms of use by the second software intelligent agent, the acceptance generated from the cognitive radio-enabled communications device automatically based upon configuration capabilities of the cognitive radio-enabled communications device;

wherein the access is subject to the first set of user-configured settings, and is implemented in response to acceptance, by the first software intelligent agent, of the terms of use established by the second software intelligent agent.

7. The system of claim 6, wherein the terms of use further include:
   network usage costs; and
   minimum bandwidth availability.

8. The system of claim 6, wherein the terms of use further include:
   time-based network usage restrictions for the cognitive radio-enabled device;
   maximum bandwidth allocation for network usage by the cognitive radio-enabled device;
   maximum throughput for use by the cognitive radio-enabled device;
   access device identity restrictions; and
   network usage access costs.

9. The system of claim 6, wherein the cognitive radio-enabled communications device includes at least one of a:
   laptop;
   cellular telephone;
   personal digital assistant;
   pager;
   global positioning system; and
   amateur radio.

10. The system of claim 6, wherein the user-configured settings are implemented via a user interface of the first intelligent software agent.

11. A non-transitory computer program product for managing access to a wireless local area network, the computer program product including instructions, the instructions embodied on a tangible storage medium, the instructions causing a computer to implement a method, comprising:
   establishing a communication between a first software intelligent agent and a second software intelligent agent via the wireless local area network, the first software intelligent agent internal to the wireless local area network and the second software intelligent agent associated with a cognitive radio-enabled communications device, the cognitive radio-enabled communications device external to, and within range of, the wireless local area network;
   retrieving a first set of user-configured settings established for designating terms of use of the wireless local area network, the first set of user-configured settings established by, and retrieved via, the first software intelligent agent, the terms of use including time of day based network usage restrictions for the cognitive radio-enabled device;
   retrieving a second set of user-configured settings for designating terms of use of the wireless local area network, the second set of user-configured settings established by the second software intelligent agent;
   presenting the terms of use to the second software intelligent agent, and the terms of use established via the second software intelligent agent to the first software intelligent agent; and
   providing the cognitive radio-enabled communications device with access to the wireless local area network upon acceptance of the terms of use by the second software intelligent agent, the acceptance generated from the cognitive radio-enabled communications device automatically based upon configuration capabilities of the cognitive radio-enabled communications device;
   wherein the access is subject to the first set of user-configured settings, and is implemented in response to acceptance, by the first software intelligent agent, of the terms of use established by the second software intelligent agent.

12. The computer program product of claim 11, wherein the terms of use further include:
   network usage costs; and
   minimum bandwidth availability.

13. The computer program product of claim 11, wherein the terms of use further include:
   time-based network usage restrictions for the cognitive radio-enabled device;
   maximum bandwidth allocation for network usage by the cognitive radio-enabled device;
   maximum throughput for use by the cognitive radio-enabled device;
   access device identity restrictions; and
   network usage access costs.

14. The computer program product of claim 11, wherein the cognitive radio-enabled communications device includes at least one of a:
   laptop;
   cellular telephone;
   personal digital assistant;
   pager;
   global positioning system; and
   amateur radio.

15. The computer program product of claim 11, wherein the user-configured settings are implemented via a user interface of the first intelligent software agent.

* * * * *